United States Patent

[11] 3,572,848

[72] Inventor Guy Marouby
 Neuilly, France
[21] Appl. No. 729,325
[22] Filed May 15, 1968
[45] Patented Mar. 30, 1971
[73] Assignee Societe Anonyme D. B. A.
 Paris, France
[32] Priority June 22, 1967
[33] France
[31] 111,452

[54] ANTI-SKID DEVICE FOR A VEHICLE BRAKING SYSTEM
 3 Claims, 5 Drawing Figs.
[52] U.S. Cl. .................................................. 303/21,
 303/20
[51] Int. Cl. .................................................. B60t 8/08
[50] Field of Search .......................................... 303/20, 21
 (A), (A4), (BE), (BB), (CE), (A1), (B), (CF)

[56] References Cited
UNITED STATES PATENTS
| | | | |
|---|---|---|---|
| 3,017,145 | 1/1962 | Yarber | 303/21(A4) |
| 3,398,995 | 8/1968 | Martin | 303/21(A4) |
| 3,469,662 | 9/1969 | Dewar | 303/21X |
| 3,235,036 | 2/1966 | Meyer et al. | 303/21(A4) |
| 3,237,996 | 3/1966 | Lucien | 303/21(BE) |
| 3,260,555 | 7/1966 | Packer | 303/21(BB) |
| 3,394,967 | 7/1968 | Lucien | 303/21(A4) |
| 3,401,984 | 9/1968 | Williams et al. | 303/21(A4) |

Primary Examiner—Duane A. Reger
Attorneys—W. N. Antonis and Plante, Arens, Hartz and O'Brien ABSTRACT: An antiskid device for a vehicle braking system utilizing an electronic sensing unit for sensing the vehicle wheel speed and elaborating therefrom a control signal which is applied to an actuating unit responding thereto by decreasing or cancelling the pressure in the vehicle braking system so as to prevent the wheel to lock up and the resulting skidding of the vehicle.

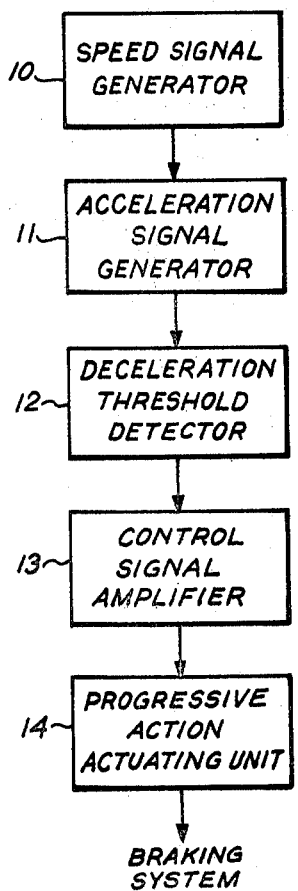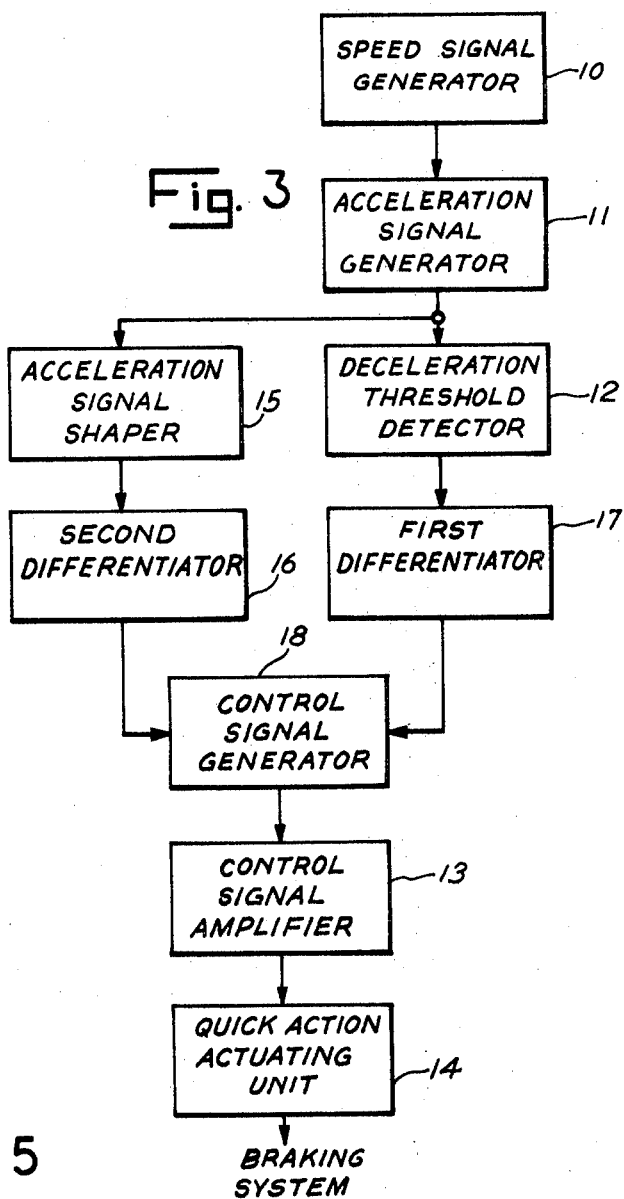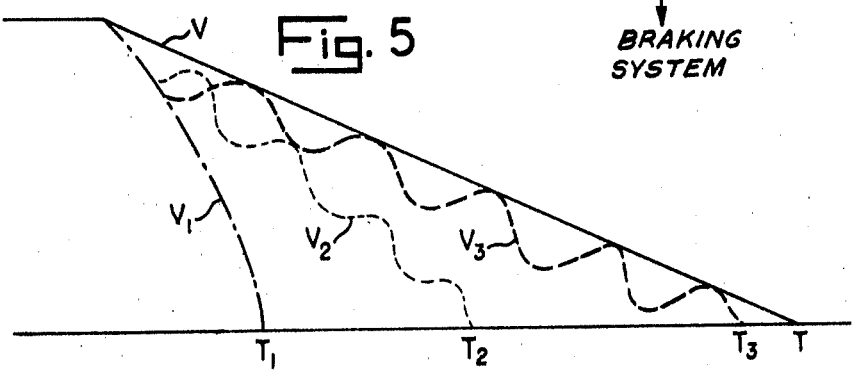

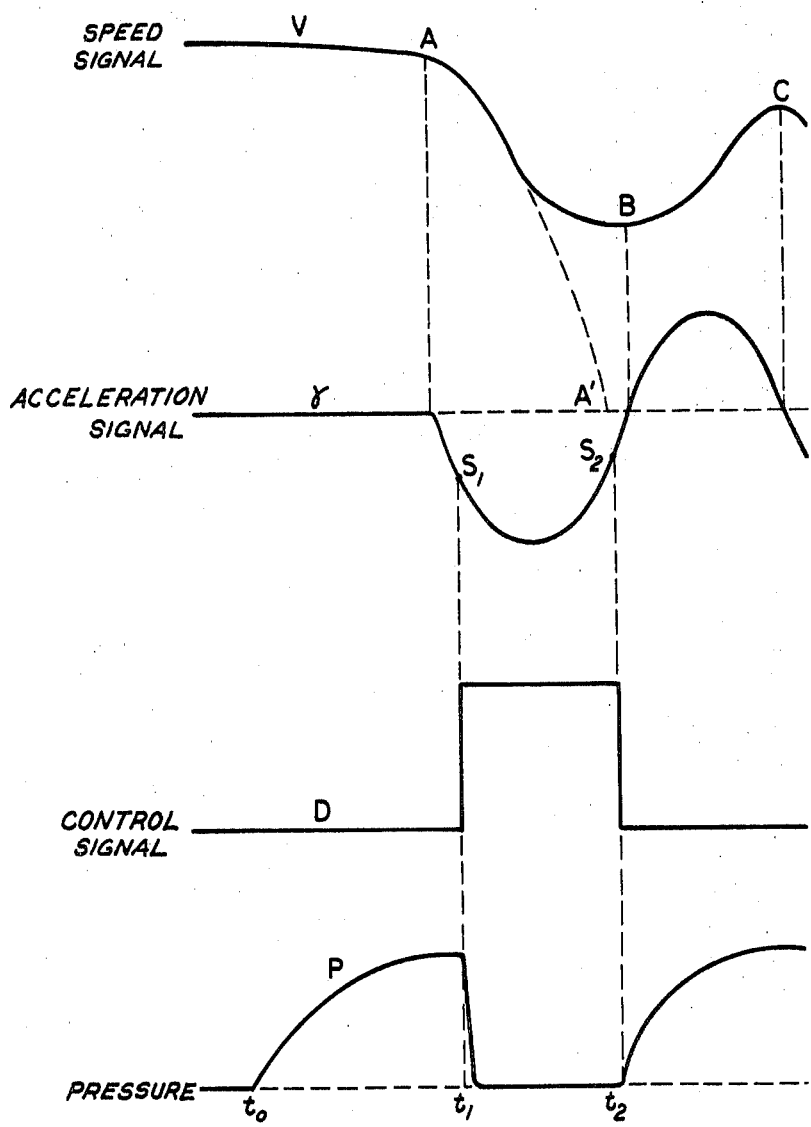

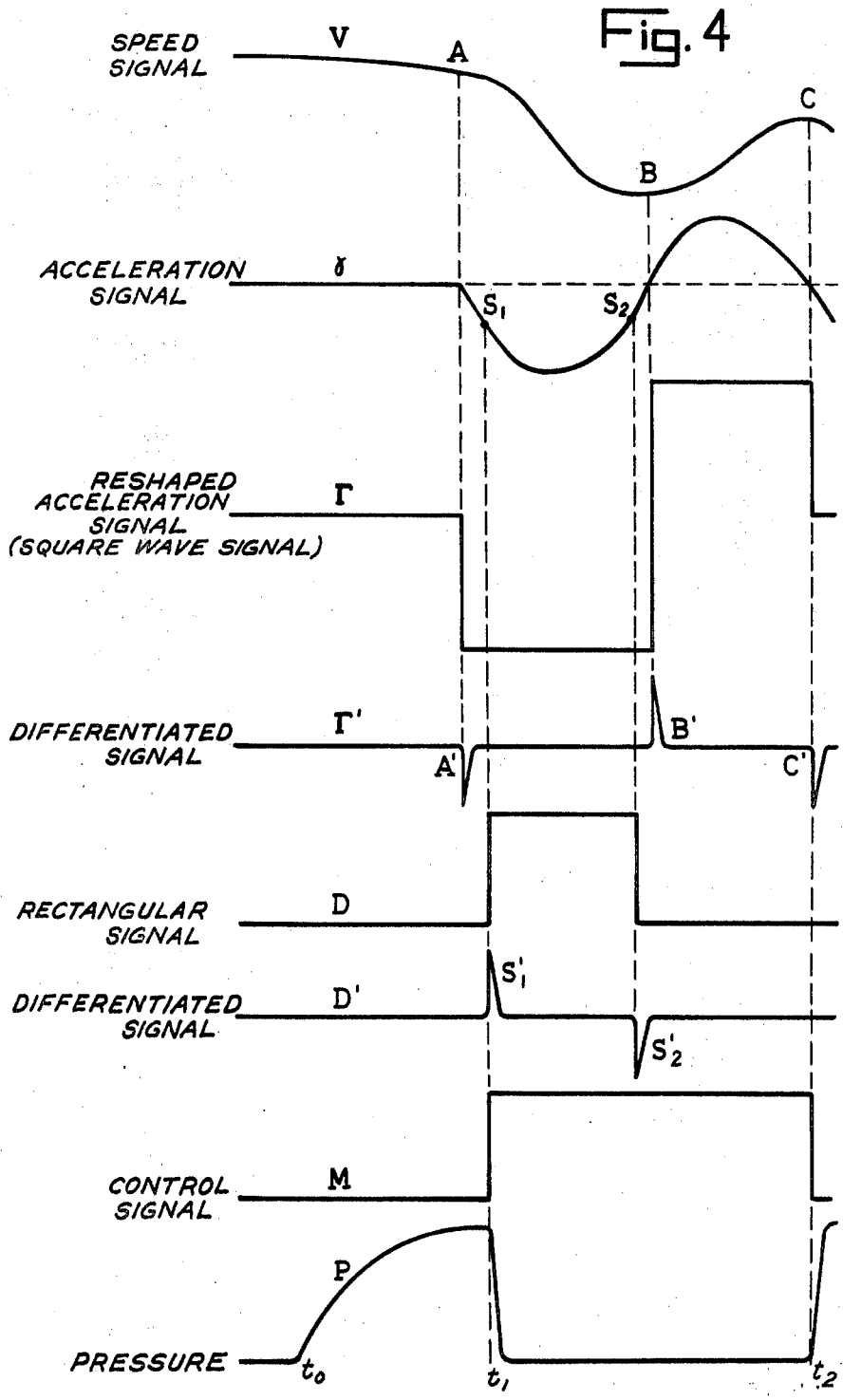

ANTI-SKID DEVICE FOR A VEHICLE BRAKING SYSTEM

BACKGROUND OF THE INVENTION

An antiskid device, which is a device adapted to prevent the wheels to lock up during braking is generally formed of a sensing unit and an actuating unit. The sensing unit is provided to sense a parameter related to braking so as to elaborate a control and then to address this control to the actuating unit which responds thereto by providing a decrease or cancellation of the braking action.

In the past it has been proposed antiskid devices having a mechanical sensing unit utilizing an inertial arrangement elastically actuated at the moment the brakes are applied. Such a mechanical sensing unit has a nonnegligible response time, is relatively inaccurate due to the action performed by elastic forces, is liable to be unintentionally actuated by marked irregularities of the road surface and to be damaged by various throwing up, and in addition needs to be carefully located with respect to the actuating unit.

On the contrary, in the antiskid device according to the present invention an electronic sensing unit is utilized which instantaneously responds to the chosen parameter, operates with a great accuracy, is unaffected by irregularities of the road surface as well as the throwing up, and exhibits a high flexibility as to the choice of its location.

SUMMARY OF THE INVENTION

The antiskid device according to the present invention is formed of an electronic sensing unit for sensing the vehicle wheel speed and elaborating therefrom a control signal, and an actuating unit responding to said control signal for decreasing or cancelling the pressure in the vehicle braking system, the electronic sensing unit comprising a speed signal generator for generating a speed signal which is proportional to wheel speed, an acceleration signal generator for generating from the speed signal an acceleration signal which is proportional to wheel deceleration or acceleration, and a deceleration threshold detector for generating the control signal which is responsive to a first value of the acceleration signal to initiate the production of the control signal and to a second value of the acceleration signal to interrupt the production of the control signal.

BRIEF DESCRIPTION OF THE DRAWINGS

FIG. 1 represents in block form one embodiment of the antiskid device according to the present invention;

FIG. 2 represents diagrams relating to the operation of the embodiment shown in FIG. 1;

FIG. 3 represents in block form a second embodiment of the antiskid device according to the present invention;

FIG. 4 represents diagrams relating to the operation of the second embodiment shown in FIG. 3; and FIG. 5 represents the action performed by the embodiments shown in FIGS. 1 and 3 with respect to the theoretical slowing down curve of the vehicle.

DESCRIPTION OF THE PREFERRED EMBODIMENTS

Referring now to FIG. 1 of the drawings there is disclosed a first embodiment of antiskid device comprising, on the one hand, a sensing unit formed of a speed signal generator 10, an acceleration (or deceleration) signal generator 11, a deceleration threshold detector 12 and a control signal amplifier 13 and, on the other hand, a progressive action actuating unit 14 the output of which acts upon the braking system.

The speed signal generator 10 senses the wheel speed and converts it into a signal voltage having a level correlative to wheel speed. The generator 10 may suitably e be either a tachymetric generator directly delivering a signal voltage proportional to wheel speed or a variable reluctance alternating current type generator providing a signal having a frequency varying directly as the wheel speed and which is converted in a frequency-voltage converter into a signal voltage proportional to wheel speed.

The acceleration (or deceleration) signal generator 11 receives the speed signal and differentiates it so as to provide a signal voltage correlative to wheel deceleration or acceleration. The generator 11 comprises, for example, a differentiating circuit to which it may be added one or several voltage amplifiers.

The deceleration threshold detector 12 receives the acceleration signal and develops a control signal as soon as the acceleration signal exceeds a level corresponding to a predetermined wheel deceleration threshold. The detector 12 may be constituted by a Schmitt trigger which is switched from its initial stable condition into its second stable condition as soon as the acceleration signal reaches a predetermined level and which is again switched into its initial stable condition when the level of the acceleration signal becomes slightly lower than the said predetermined level. The Schmitt trigger develops a control signal as long as it remains in its second stable condition.

The control signal provided by the deceleration threshold detector 12 is amplified in the amplifier 13 which may be a conventional direct-coupled amplifier, and the amplified control signal is applied to the actuating unit 14 where it is utilized to operate one or several electrovalves so that this unit controls the pressure in the braking system.

Reference is now made to FIG. 2 of the drawings for an explanation of the operation of the just described embodiment. The curve V represents the speed signal provided by the generator 10 and corresponds to the linear wheel speed. The curve $\gamma$ represents the acceleration signal provided by the generator 11 and corresponds to the linear wheel deceleration and then to the linear wheel acceleration. The curve D represents, after amplification, the control signal provided by the threshold detector 12 and the curve P represents the pressure in the braking system.

The pressure (curve P) in the braking system is applied at an instant $t_o$. A short time interval later, at A on the curve V, the wheel speed begins to decrease and, if the antiskid device according to the invention were not provided and if the vehicle driver continued to maintain the pressure in the braking system, the wheel speed would decrease along the branch AA' and the wheel lockup would be reached at A'. However, because of to the antiskid device, as soon as the wheel deceleration reaches at an instant $t_1$ a predetermined threshold value (at $S_1$ on curve $\gamma$), the acceleration signal delivered by the generator 11 triggers the threshold detector 12 which then instantaneously develops a control signal (curve D) which operates the actuating unit 14 by means of one or several electrovalves thereof so that this unit reduces or cancels the pressure in the braking system. Once the wheel deceleration has reached a maximum value, the wheel speed decreases more slowly and the wheel deceleration decreases and passes at an instant $t_2$ through a second predetermined threshold value (at $S_2$ on curve $\gamma$) for which the threshold detector 12 interrupts the production of the control signal, so that the actuating unit 14 restores the pressure in the braking system. Due to the vehicle inertia as well as the wheel grip with the road surface and due to the fact that the braking pressure is only progressively restored, the wheel speed (curve V), after having reached a minimum value at B, increases again up to C where it begins to decrease and, as soon as the threshold value $S_1$ of the wheel deceleration is reached once again, the cycle repeats itself.

It has been represented in FIG. 5 the theoretical slowing down curve V of the vehicle between the instant from which the braking is applied and the instant T where the vehicle translation as well as the wheel rotation are interrupted. On the contrary, when a wheel lockup occurs, the wheel rotation comes to a stop while the vehicle translation is still going on.

As already mentioned above, if the antiskid device according to the invention were not provided and if the vehicle driver continued to maintain the pressure in the braking system, the wheel speed would quickly decrease along the speed curve $V_1$ and the wheel lockup would be reached at the instant $T_1$ located well before the theoretical instant T where the translation of the vehicle should come to a stop.

Although the embodiment shown in FIG. 1 provides successful practical results, it could still happen, in spite of ti its utilization, for example if the pressure were too abruptly restored in the braking system, that the wheel speed substantially deviates from the theoretical slowing down curve V and follows the cycles of the speed curve $V_2$, in which case the wheel lockup would be reached at the instant $T_2$ still located before the theoretical instant T, but nevertheless much farther on than the instant $T_1$ of the premature wheel lockup which occurs in case no antiskid device is provided.

A second embodiment of the antiskid device according to the invention is shown in FIG. 3, which embodiment prevents the above-mentioned eventual drawback and causes the wheel speed to follow the cycles of the speed curve $V_3$ which closely remains near the theoretical curve V and for which the wheel lockup is reached at the instant $T_3$ which may be practically confounded with the theoretical instant T where the vehicle translation comes to a stop.

The elements which in the second embodiment are similar to those found in the first embodiment shown in FIG. 1 will be designated with the same reference numerals and not described in details.

The second embodiment shown in FIG. 3 comprises, on the one hand, a sensing unit formed of a speed signal generator 10, an acceleration (or deceleration) signal generator 11, a deceleration threshold detector 12, an acceleration signal shaper 15, two differentiators 16 and 17, a control signal generator 18 and a control signal amplifier 13 and, on the other hand, a quickly acting actuating unit 14 the output of which acts upon the braking system.

As before, the generator 10 applies to the generator 11 a voltage signal correlative to wheel speed and the generator 11 develops a voltage signal correlative to wheel deceleration or acceleration. For a purpose which will soon appear from the description, the acceleration signal developed by the generator 11 is not only applied to the deceleration threshold detector 12 but also to an acceleration signal shaper 15.

The detector 12 generates a continuous signal as soon as the acceleration signal exceeds a level corresponding to a predetermined wheel deceleration threshold, and this continuous signal is interrupted as soon as the wheel deceleration becomes slightly lower than the said predetermined threshold. The signal produced by the detector 12 is therefore a rectangular signal and this signal is differentiated in the differentiator 17 which produces in time coincidence with the leading and trailing edges of the rectangular signal two narrow pulses of opposite polarities. From these two pulses, only the first one which is produced in time coincidence with the predetermined deceleration threshold is retained.

The acceleration signal shaper 15 is adapted to convert the sine-type wave of the acceleration signal into a square wave having steep edges and this may be obtained by utilizing the for the shaper 15 an overdriven amplifier. The square wave signal generated by the shaper 15, which is provided for causing the sign changes of the acceleration signal to more distinctly appear, is applied to the differentiator 16 which differentiates this square wave signal and produces three narrow pulses of alternate polarities which are respectively time coincident with the zero crossing points of the acceleration signal. From these three narrow pulses, only the third one is used. A common method of forming the differentiators 16 and 17 mentioned in this and the preceding paragraph is by a simple R-C network.

The first pulse delivered by the differentiator 17 and the third pulse delivered by the differentiator 16 are successively and respectively applied to two inputs of the control signal generator 18, which may be constituted by a bistable multivibrator. Thus, the first pulse which is time coincident with the predetermined deceleration threshold switches the bistable multivibrator from its initial stable condition to its second stable condition and the multivibrator then produces a control signal. The third pulse which is time coincident with the third zero crossing point of the acceleration signal switches the bistable multivibrator into its original stable condition and the production of the control signal is interrupted.

The control signal produced by the generator 18 is amplified in the amplifier 13, and the amplified control signal is applied to the actuating unit 14 where it is utilized to operate one or several electrovalves so that this unit controls the pressure in the braking system.

Reference is now made to FIG. 4 of the drawing for an explanation of the operation of the just described second embodiment of the invention. The curve V represents the speed signal provided by the generator 10 and corresponds to the linear wheel speed. The curve $\gamma$ represents the acceleration signal provided by the generator 11 and corresponds to the linear wheel deceleration and then to the linear wheel acceleration. The curve $\Gamma$ represents the clipped amplified acceleration signal (square wave signal). The curve $\Gamma'$ represents the narrow pulses which are obtained by differentiating the clipped amplified acceleration signal. The curve D represents the rectangular signal developed by the threshold detector 12. The curve D' represents the narrow pulses which are obtained by differentiating the rectangular signal. The curve M represents, after amplification, the control signal provided by the generator 18 (bistable multivibrator) and the curve P represents the pressure in the braking system.

The pressure (curve P) in the braking system is applied at an instant $t_0$. A short time interval later, at A on the curve V, the wheel speed begins to decrease. As soon as the wheel deceleration reaches at an instant $t_1$ a predetermined threshold value (at $S_1$ on curve $\gamma$), the acceleration signal delivered by the generator 11 triggers the threshold detector 12 which then instantaneously develops the rectangular signal (curve D) and, simultaneously, the differentiator 17 generates the pulse $S'_1$ (curve D') and the control signal generator 18, to which is applied the last-mentioned pulse, produces a control signal (curve M) which operates the actuating unit 14 by means of one or several electrovalves thereof so that this unit reduces or cancels the pressure in the braking system. Once the wheel deceleration has reached a maximum value, the wheel speed decreases more slowly and the wheel deceleration decreases and passes through a second predetermined threshold value (as $S_2$ on the curve $\gamma$) for which the threshold detector 12 interrupts the production of the rectangular signal and, simultaneously, the differentiator 17 generates the second pulse $S'_2$ of opposite polarity which is eliminated, for example by a diode. At a point B on the curve V the wheel speed ceases from decreasing and then begins to increase until a maximum value is reached at point C on the curve V.

According to the second embodiment of the invention, it is when the wheel has reached again a maximum speed, i.e. at C on the curve V, that the control signal must be interrupted to cause the pressure to be quickly restored in the braking system. This is because the time interval between points A and C is a function of the wheel grip with the road surface, so that the intervening time of the actuating unit 14, during which the pressure is reduced or cancelled in the braking system, is thus variable and proportional to the road surface conditions. Accordingly, the second embodiment of the invention permits to optimalize the action of the braking system.

In order to accurately sense the point C of the speed curve, the solution utilized, by way of example, in the second embodiment of the invention resides, on the one hand, in saturation amplifying in the shaper 15 the acceleration signal so as to emphasize without ambiguity the instants A, B and C of the speed curve V which respectively correspond to the beginning of the wheel deceleration, the crossing into acceleration of the wheel and the end of the wheel acceleration. In this manner, the transitional variations of the signal $\Gamma$ delivered by the shaper 15 are exactly in time coincidence with the three instants A, B and C. On the other hand, this solution resides in differentiating the signal $\Gamma$ in the differentiator 16 so as to then obtain the signal $\Gamma'$ formed of three narrow pulses A', B' C' which are respectively time coincident with the three instants A, B and C. However, only the pulse C' which is time coincident with the instant C indicating the end of the wheel acceleration is of interest and must be therefore retained and applied to the generator 18 to interrupt the production of the control signal generated thereby and thus to cause the actuating unit 14 to quickly restore at an instant $t_2$ (which is in time coincidence with the instant C of the curve V) the pressure in the braking system. The three pulses A', B' and C' are of alternate polarities, with the first one A' being of negative polarity, the second one B' of positive polarity and the third one C' of negative polarity. The second pulse B' which is of opposite polarity with respect to the first and third pulses is eliminated, for example by a diode. The first pulse, due to the design of the control signal generator 18 has no effect upon the same. Accordingly only acts upon the generator 18 the third pulse C'. This is because, with the generator 18 formed, as previously mentioned, of a bistable multivibrator, the negative pulse A' from the differentiator 16, which is applied to the first multivibrator input, finds the multivibrator in its initial stable condition and does not switch it. The positive pulse $S'_1$ from differentiator 17 which is time succeeding to the pulse A' is applied to the second multivibrator input and switches the multivibrator into its second stable condition. The pulses $S'_2$ and B' are, as previously mentioned, eliminated by diodes. The negative pulse C' which then effectively succeeds to the pulse $S'_1$ is applied from the differentiator 16 to the first multivibrator input, and finds the multivibrator in its second stable condition and now switches it into its initial stable condition.

All the components of the sensing units respectively shown in FIGS. 1 and 3 are transistorized and therefore these units are not energy consuming and can be made in the form of a compact structure which may be placed in any suitable location.

It should be obvious from the description of the preferred embodiments that an antiskid device could be provided for each braked wheel or for each pair of braked wheels, for instance the rear pair and the front pair. Also, it should be understood that the antiskid device is only operated when the brake pedal is utilized, in a manner for example of the energization of a stoplight. One skilled in the art can make certain other changes and modifications without departing from the teachings and the scope of the invention as defined by the following claims.

I claim:

1. An antiskid device for a vehicle braking system comprising an electronic sensing unit for sensing the vehicle wheel speed and producing therefrom a control signal, and an actuating unit responding to the control signal for decreasing or cancelling the pressure in the vehicle braking system, said electronic sensing unit including means for generating a speed signal which is proportional to wheel speed, means for generating from the speed signal, an acceleration signal which is proportional to wheel deceleration or acceleration, and means selectively responsive to the acceleration signal for generating said control signal, characterized in that said selective responsive means is responsive to a first value of said acceleration signal to initiate the production of said control signal and to a second value of said acceleration signal to interrupt the production of said control signal, said selective responsive means comprises first and second branch circuits having their inputs receiving said acceleration signal and their outputs respectively connected to the two inputs of a bistable device provided for generating said control signal, said first branch circuit including in the order of a Schmitt trigger, a first differentiator and a first clipping diode and said second branch circuit including in the order of an acceleration signal shaper, a second differentiator and a second clipping diode.

2. An antiskid device as claimed in claim 1, in which the output signal of said first branch circuit is delivered to one input of said bistable device in time coincidence with the occurrence of the first value of said acceleration signal and the output signal of said second branch circuit is delivered to the other input of said bistable device in time coincidence with the occurrence of the second value of said acceleration signal.

3. An antiskid device as claimed in claim 2, in which the first value of said acceleration signal corresponds to a predetermined threshold of wheel deceleration and the second value of said acceleration signal corresponds to the end of the wheel acceleration period which follows the wheel deceleration period.